(12) United States Patent
Gomez et al.

(10) Patent No.: US 11,034,611 B2
(45) Date of Patent: Jun. 15, 2021

(54) SCRATCH RESISTANT GLASS AND METHOD OF MAKING

(71) Applicant: Corning Incorporated, Corning, NY (US)

(72) Inventors: Sinue Gomez, Corning, NY (US); Robert Michael Morena, Lindley, NY (US); Douglas Miles Noni, Jr., Horseheads, NY (US); James Joseph Price, Corning, NY (US); Sara Jean Sick, Beaver Dams, NY (US)

(73) Assignee: CORNING INCORPORATED, Corning, NY (US)

( * ) Notice: Subject to any disclaimer, the term of this patent is extended or adjusted under 35 U.S.C. 154(b) by 344 days.

(21) Appl. No.: 15/585,817

(22) Filed: May 3, 2017

(65) Prior Publication Data
US 2017/0283308 A1 Oct. 5, 2017

Related U.S. Application Data

(62) Division of application No. 14/714,819, filed on May 18, 2015, now Pat. No. 9,670,088.
(Continued)

(51) Int. Cl.
*C03C 11/00* (2006.01)
*C03C 3/097* (2006.01)
(Continued)

(52) U.S. Cl.
CPC .............. *C03C 11/00* (2013.01); *C03C 3/085* (2013.01); *C03C 3/087* (2013.01); *C03C 3/091* (2013.01);
(Continued)

(58) Field of Classification Search
None
See application file for complete search history.

(56) References Cited

U.S. PATENT DOCUMENTS

| | | | |
|---|---|---|---|
| 3,524,737 | A | 8/1970 | Doyle et al. |
| 3,790,430 | A | 2/1974 | Mochel |

(Continued)

FOREIGN PATENT DOCUMENTS

| | | |
|---|---|---|
| EP | 1106586 | 12/2000 |
| GB | 2221083 | 1/1990 |

(Continued)

OTHER PUBLICATIONS

Elmer, Leaching of E-Glass, J. American Ceramic Society, vol. 67, No. 12, Dec. 1984, pp. 778-782.*
(Continued)

*Primary Examiner* — James M Mellott
(74) *Attorney, Agent, or Firm* — Kevin M. Johnson

(57) ABSTRACT

A scratch resistant alkali aluminoborosilicate glass. The glass is chemically strengthened and has a surface layer that is rich in silica with respect to the remainder of the glass article. The chemically strengthened glass is then treated with an aqueous solution of a mineral acid other than hydrofluoric acid, such as, for example, HCl, $HNO_3$, $H_2SO_4$, or the like, to selective leach elements from the glass and leave behind a silica-rich surface layer. The silica-rich surface layer improves the Knoop scratch threshold of the ion exchanged glass compared to ion exchanged glass that are not treated with the acid solution as well as the post-scratch retained strength of the glass.

16 Claims, 5 Drawing Sheets

Related U.S. Application Data

(60) Provisional application No. 62/000,717, filed on May 20, 2014.

(51) Int. Cl.
| | | |
|---|---|---|
| *C03C 3/087* | (2006.01) | |
| *C03C 3/091* | (2006.01) | |
| *C03C 4/18* | (2006.01) | |
| *C03C 3/085* | (2006.01) | |
| *C03C 15/00* | (2006.01) | |
| *C03C 21/00* | (2006.01) | |
| *C03C 23/00* | (2006.01) | |

(52) U.S. Cl.
CPC ............... *C03C 3/097* (2013.01); *C03C 4/18* (2013.01); *C03C 11/005* (2013.01); *C03C 15/00* (2013.01); *C03C 21/002* (2013.01); *C03C 23/008* (2013.01); *C03C 2204/00* (2013.01); *Y10T 428/315* (2015.01)

(56) References Cited

U.S. PATENT DOCUMENTS

| | | |
|---|---|---|
| 3,954,487 A | 5/1976 | Gliemeroth et al. |
| 4,018,965 A | 4/1977 | Kerko et al. |
| 4,166,745 A | 9/1979 | Araujo et al. |
| 4,298,389 A | 11/1981 | Johnson et al. |
| 4,549,894 A | 10/1985 | Araujo et al. |
| 4,926,006 A | 5/1990 | Kawamura et al. |
| 5,036,030 A | 7/1991 | Taga et al. |
| 5,219,801 A | 6/1993 | Shorrock et al. |
| 5,277,946 A | 1/1994 | Nagai et al. |
| 5,455,211 A | 10/1995 | McMillan et al. |
| 5,489,558 A | 2/1996 | Moffatt et al. |
| 5,674,790 A | 10/1997 | Araujo |
| 5,721,181 A | 2/1998 | Sehgal et al. |
| 5,741,745 A | 4/1998 | Sehgal et al. |
| 5,770,535 A | 6/1998 | Brix et al. |
| 5,801,109 A | 9/1998 | Nishizawa et al. |
| 5,876,472 A | 3/1999 | Gros et al. |
| 6,066,273 A | 5/2000 | Yamaguchi et al. |
| 6,096,670 A | 8/2000 | Lautenschlager et al. |
| 6,187,429 B1 | 2/2001 | Weinberg et al. |
| 6,268,304 B1 | 7/2001 | Maeda et al. |
| 6,319,867 B1 | 11/2001 | Chacon et al. |
| 6,329,310 B1 | 12/2001 | Peuchert et al. |
| 6,440,531 B1 | 8/2002 | Kurachi |
| RE37,920 E | 12/2002 | Moffatt et al. |
| 6,532,770 B2 | 3/2003 | Uhlik et al. |
| 6,794,323 B2 | 9/2004 | Peuchert et al. |
| 6,812,175 B2 | 11/2004 | Kawase et al. |
| 6,818,576 B2 | 11/2004 | Ikenishi et al. |
| 6,831,029 B2 | 12/2004 | Chacon et al. |
| 6,946,414 B2 | 9/2005 | Bitossi et al. |
| 6,960,545 B2 | 11/2005 | Wolff et al. |
| 7,217,673 B2 | 5/2007 | Naumann et al. |
| 7,341,966 B2 | 3/2008 | Marques |
| 7,482,296 B2 | 1/2009 | Messerschmidt et al. |
| 7,534,734 B2 | 5/2009 | Ellison |
| 7,566,673 B2 | 7/2009 | Kawai |
| 7,666,511 B2 | 2/2010 | Ellison et al. |
| 7,960,301 B2 | 6/2011 | Niida et al. |
| 8,158,543 B2 | 4/2012 | Dejneka et al. |
| 8,168,295 B2 | 5/2012 | Murata |
| 8,232,218 B2 | 7/2012 | Dejneka et al. |
| 8,431,502 B2 | 4/2013 | Dejneka et al. |
| 8,586,492 B2 | 11/2013 | Barefoot et al. |
| 8,652,978 B2 | 2/2014 | Dejneka et al. |
| 8,889,254 B2 | 11/2014 | Bayne et al. |
| 2001/0038929 A1 | 11/2001 | Uhlik et al. |
| 2003/0031878 A1 | 2/2003 | Mitani et al. |
| 2003/0045420 A1 | 3/2003 | Koyama et al. |
| 2003/0109370 A1 | 6/2003 | Ikenishi et al. |
| 2004/0132606 A1 | 7/2004 | Wolff et al. |
| 2005/0090377 A1 | 4/2005 | Shelestak et al. |
| 2005/0096210 A1 | 5/2005 | Kawai |
| 2005/0137075 A1 | 6/2005 | Messerschmidt et al. |
| 2005/0250639 A1 | 11/2005 | Siebers et al. |
| 2009/0129061 A1 | 5/2009 | Fechner et al. |
| 2009/0142568 A1 | 6/2009 | Dejneka et al. |
| 2009/0197048 A1* | 8/2009 | Amin ................. C03C 3/085 428/142 |
| 2009/0202808 A1 | 8/2009 | Glaesemann et al. |
| 2010/0047521 A1 | 2/2010 | Amin et al. |
| 2010/0151210 A1 | 6/2010 | Shimatani |
| 2010/0160141 A1 | 6/2010 | Ikenishi et al. |
| 2010/0285272 A1 | 11/2010 | Koval et al. |
| 2011/0045961 A1 | 2/2011 | Dejneka et al. |
| 2011/0165393 A1 | 7/2011 | Bayne et al. |
| 2011/0305899 A1 | 12/2011 | Neander |
| 2012/0134025 A1 | 5/2012 | Hart |
| 2013/0122306 A1 | 5/2013 | Bookbinder et al. |
| 2013/0233018 A1 | 9/2013 | Takashima et al. |
| 2014/0356576 A1 | 12/2014 | Dejneka et al. |
| 2015/0132759 A1 | 5/2015 | Grenier et al. |
| 2016/0068423 A1 | 3/2016 | Tanaka |

FOREIGN PATENT DOCUMENTS

| | | |
|---|---|---|
| JP | 472274 | 12/1974 |
| JP | 58161945 | 9/1983 |
| JP | 58-199744 A | 11/1983 |
| JP | 64-42025 | 2/1989 |
| JP | 01-319232 A | 12/1989 |
| JP | 11-310431 | 11/1999 |
| JP | 11-310432 | 11/1999 |
| JP | 2000159538 | 6/2000 |
| JP | 2002174810 | 6/2002 |
| JP | 2004131314 | 4/2004 |
| JP | 200662929 | 3/2006 |
| JP | 2010-202514 A | 9/2010 |
| JP | 2011-510904 A | 4/2011 |
| JP | 2011213576 | 10/2011 |
| JP | 2012-131695 A | 7/2012 |
| WO | 2007020825 | 2/2007 |
| WO | 2009070237 | 6/2009 |
| WO | 2009/099615 A1 | 8/2009 |
| WO | 2010021746 | 2/2010 |
| WO | 2010129624 | 11/2010 |
| WO | 2012074078 | 6/2012 |
| WO | 2012074080 | 6/2012 |

OTHER PUBLICATIONS

Deriano, "Physical and mechanical properties of a new borosilicate glass"; Annales de chimie—science des materiaux 28, (2003), pp. 55-62.

Deubener, "Crack tip fracture toughness of base glasses for dental restoration glassceramics using crack opening displacements", Journal of the Mechanical Behavior of biomedical Materials, 4 (2011), pp. 1291-1298.

Gross; "A glass with high crack initiation load: role of fictive temperature-independent mechanical properties"; Journal of Non-crystalline solids, 355 (2000) pp. 5623-568.

Hornberger; "Microstruture of a high strength alumina glass composite"; Journal of materials research, 11 (1996), pp. 855-858.

Ito; "Structural study on mechanical behavior of glass"; Journal of the ceramic society of Japan, 112 [9] pp. 477-485 (2004).

Kato; "Effect of densification on crack initiation under vickers indentation test"; Journal of non-crystalline solids 356 (2010) pp. 1768-1773.

Kingston, et al; "Compositional effects on the fracture behaviour of alkali-silicate glasses", 2000 Blackwell Science Ltd. Fatigue Fract Engng Mater Struct 23, pp. 685-690.

Lawn et al, "Hardness, Toughness, and Brittleness: An Indentation Analysis"; Journal American Ceramic Society, vol. 62, No. 7-8 pp. 347-350.

McMillan et al; "Raman Spectroscopy of Calcium Aluminate Glasses and Crystals" J. Non-Cryst Solids, 55, 221, (1983).

(56) References Cited

OTHER PUBLICATIONS

Morris et al; "Indentation crack initiation in ion-exchanged aluminosilicate glass"; Journal of Material Science 39, (2004) 2399-2410.

Nakai; "Effect of aluminum ions on intrinsic sub-critical growth in metaphosphate glasses"; Journal of Non-crystalline solids 353 (2007) pp. 2250-2257.

Rizkalla; "Effect of nonbridging oxygen on the fracture toughness of synthesized glasses"; Br. Ceram. Trans. J, 91 pp. 12-15, 1992.

Seal, "Effect of separation on the fracture toughness of SiO2—B2O3—Na2O glass"; Bulletin of Material Science, 28, (2005)pp. 457-460.

Sehgal et al; "A new low-brittleness glass in the soda-limel-silica glass family"; Journal American Ceramic Society, 81, [9] 2485-88 (1998).

Sehgal et al; "Brittleness of glass"; Journal of Non-Crystalline Solids, 253, (1999) 126-132.

Simmons; "Effects of Phase separation on crack growth in borosilicate glass" Journal of Non-crystalline solids, 38&39 (1980) pp. 503-508.

Smedskjaer et al; "Prediction of Glass Hardness Using Temperature-Dependent Constraint Theory"; Physical Review Letters Sep. 8, 2010.

Sugimura; "Compositional Dependence of Mechanical Properties in Aluminosilicate borate and phosphate glasses"; Journal of the Ceramic Society of Japan 110 (2002) pp. 1103-1108.

Taniguchi; "Deformation and fracture of soda-lime-silica glass under tension by molecular dynamics simulation"; Journal of the Cermic Society of Japan 116, (2008) pp. 885-889.

West; "Silica fracture"; Journal of Materials Science 30 (1995) pp. 6281-6287.

Wilantewic; "Crack initiation behavior of optical grasses from vickers initiation"; PhD Theiss, Alfred University, Nov. 2005, pp. 27-39 and 54-56.

Wilantewicz; "The effects of lithium, boron, and magnesium oxides on the mechanical properties of silicate glasses"; M.S. Thesis, Alfred University, Jul. 1998, pp. 6-7, 38-47.

Wilantewicz; "Vickers indentation fracture in optical glass compositions", Fractography of Glasses and Ceramics V pp. 131-151.

Yoshida; "Crack growth in the high crack velocity region for binary sodium silicate glasses" Journal of the ceramic society of Japan 108 (2000) pp. 948-951.

Yoshida; "Crack initiation behavior of sodium aluminosilicate glasses": Journal of Non-crystalline solids, 344 (2004) pp. 37-43.

Zou et al; "Compositional Design of High Modulus Glasses for Disk Substrates"; J. Non-Cryst Solids, 290, 180 (2001).

PCT/US2015/031491 PCT Search Report dated Aug. 5, 2015.

Chernyak; "Continuous Glass Fiber"; Edition 1; China Construction Industry Press; 1975; 3 Pages.

Chinese Patent Application No. 201580026924.1 Third Office Action dated May 6, 2020, China Patent Office, 11 Pgs.

Japanese Patent Application No. 2020-019722, Office Action dated Mar. 31, 2021, 5 pages (English Translation Only); Japanese Patent Office.

* cited by examiner

SCRATCH RESISTANT GLASS AND METHOD OF MAKING

This application claims the benefit of priority under 35 U.S.C. § 119 of U.S. Provisional Application Ser. No. 62/000,717, filed on May 20, 2014, the content of which is relied upon and incorporated herein by reference in its entirety.

BACKGROUND

The disclosure relates to a scratch-resistant glass. More particularly, the disclosure relates to a glass having a scratch resistant layer. Even more particularly, the disclosure relates to a method of providing a glass with improved scratch resistance.

Ion exchangeable glasses are widely used as cover glasses and in the bodies of electronic devices. Although ion exchange provides enhanced surface strength to the glass, the improvement in hardness is minimal, and the glass is still susceptible to scratches caused by exposure to materials that are harder than glass.

Attempts to improve scratch or abrasion resistance typically include manipulating the composition of the glass itself to increase hardness, use of alternate materials, or applying hard coatings to the glass surface. In most instances, cost, poor scalability, and loss of transparency makes such approaches unsuitable for large area glass applications.

SUMMARY

A scratch resistant glass is provided. The glass is has a surface layer that is rich in silica with respect to the remainder of the glass article. the glass article may comprise an alkali aluminosilicate glass, an alkali aluminoborosilicate glass, or a borosilicate glass. The glass is treated with an aqueous solution of a mineral acid other than hydrofluoric acid (HF), such as, for example, HCl, $HNO_3$, $H_2SO_4$, or the like to selectively leach elements from the glass and leave behind a silica-rich surface layer. In some embodiments, the aqueous solution excludes hydrofluoric acid. In some embodiments, the glass is chemically strengthened, for example, by ion exchange and then treated with the aqueous mineral acid solution. When compared to glass that is not treated with the acid solution, the silica-rich surface layer improves the Knoop scratch threshold of the glass as well as the post-scratch retained strength of the glass.

Accordingly, one aspect of the disclosure is to provide a glass article having a porous $SiO_2$-rich region extending from a surface of the glass article to a depth of up to about 600 nm into the glass article. The glass article has a Knoop scratch initiation threshold of at least about 12 N. In some embodiments the glass is acid treated to form the $SiO_2$-rich region. In certain embodiments, the glass is ion exchanged before the $SiO_2$-rich region is formed.

A second aspect of the disclosure is to provide a method of making a scratch-resistant glass article comprising $SiO_2$. The method comprises forming a porous silica-rich layer extending from a surface of the ion exchanged glass article to a depth of up to about 600 nm. The glass article has Knoop crack initiation threshold A third aspect of the disclosure is to provide a method of improving the scratch resistance of a chemically strengthened glass. The method comprises treating the surface of the chemically strengthened glass with an acid at a predetermined temperature for a predetermined time to remove non-silica components from the surface of the glass and forming a porous silica-rich layer on the surface of the glass. The porous silica-rich layer extends from the surface to a depth of up to about 600 nm into the bulk of the glass.

These and other aspects, advantages, and salient features will become apparent from the following detailed description, the accompanying drawings, and the appended claims.

DETAILED DESCRIPTION

Figure 1:
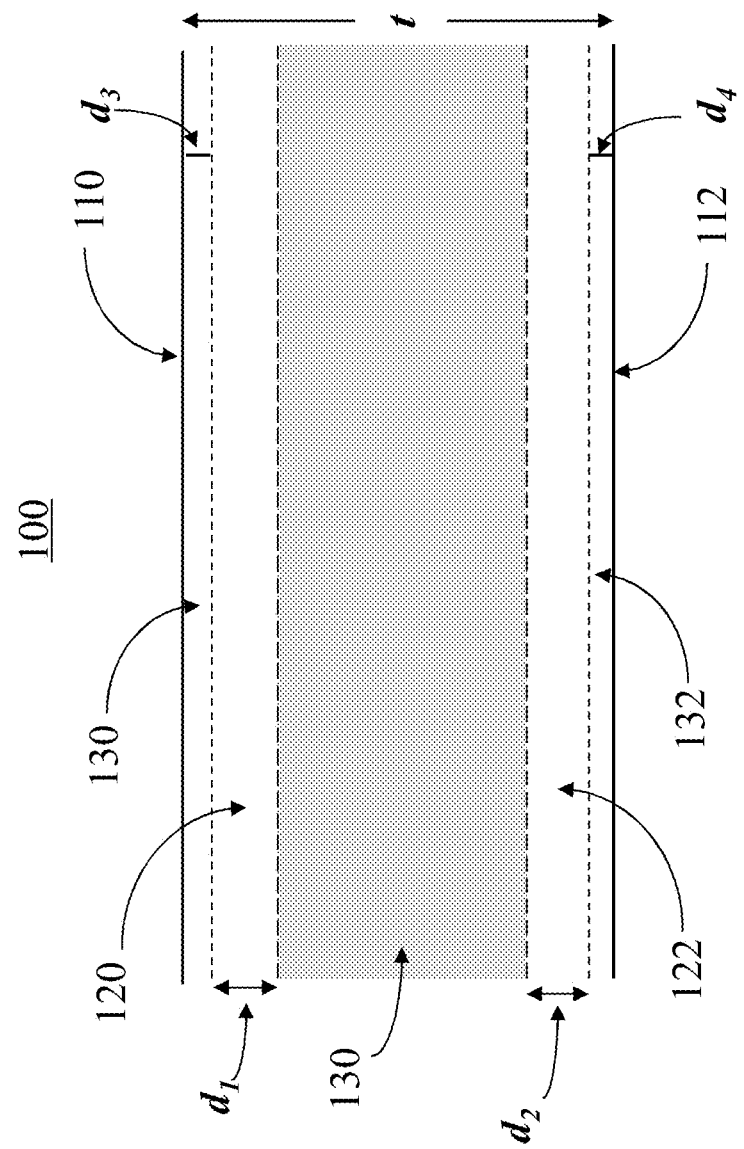
FIG. 1 is a schematic cross-sectional view of a planar ion exchanged glass article having a scratch resistant silica-rich surface layer.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations thereof.

As used herein, the terms "glass article" and "glass articles" are used in their broadest sense to include any object made wholly or partly of glass. Unless otherwise specified, all compositions are expressed in terms of mole percent (mol %) and all temperatures are expressed in degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant.

Knoop scratch thresholds (KST) described herein are determined using a Knoop diamond indenter. The scratch threshold is determined by first identifying the load range for lateral crack onset. Once the load range is identified, a series of 5 mm long scratches under increasing constant load with three or more scratches per load are generated at a speed of 4 mm/s in order to identify the Knoop scratch threshold. Lateral cracks are defined as sustained cracks that are larger than twice the width of the groove.

Vickers crack initiation thresholds (VIT) described herein are determined by applying and then removing an indentation load to the glass surface at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC is in turn measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Although ion exchange provides enhanced surface strength to glass, the improvement in hardness is minimal, and the glass is still susceptible to scratches caused by exposure to materials that are harder than glass. Attempts to improve scratch or abrasion resistance typically include manipulating the composition of the glass itself to increase hardness, use of alternate materials, or applying hard coatings to the glass surface. Compositions may be altered, for example, by minimizing the number of non-bridging oxygen atoms (NBOs) in the glass. Harder materials, such as sapphire or the like, may be used as a substrate or window in lieu of glass, but high processing temperatures, manufacturing processes, and the need for polishing to the desired thickness and shape may be a drawback in terms of scalability and cost. Layers of hard polycrystalline ceramic materials such as sapphire, alumina, diamond-like carbon, and silicon nitrides, carbides, oxycarbides, and the like may be applied to the surface of the glass. In most instances, cost, poor scalability, and loss of transparency makes this approach unsuitable for large area glass applications.

Described herein are scratch-resistant alkali aluminosilicate, alkali aluminoborosilicate, and borosilicate glasses having an integral scratch-resistant layer, A method of forming such a layer and a method of improving the scratch resistance of a glass article are also described. A glass article such as, for example, a sheet or plate, is treated in an acidic aqueous solution at a given temperature for a specified time period. During this process, elements of the glass are selectively removed—or leached—leaving behind a porous silica-rich layer extending from the treated surface to a depth within the glass. As used herein, the term "silica-rich" means that the concentration of silica ($SiO_2$) in this region is greater than the average silica concentration measured for the bulk of the glass, as a result of the leaching of other components of the glass by the acid treatment. Compared to non-treated glass articles of the same composition, the silica-rich layer improves the scratch resistance of the treated glass surface, as determined by the Knoop scratch threshold, by a factor of 1.5 to 3. In some embodiments, the scratch resistance of the treated glass increases fourfold over that of untreated strengthened glass. In some embodiments, the glass article has a Knoop scratch initiation threshold of at least about 12 Newtons (N) and, in other embodiments, at least about 16 N. In certain embodiments, the Knoop scratch initiation threshold is in a range from about 20 N to about 60 N.

In some embodiments, the glass is chemically strengthened by ion exchange methods that are known in the art. Ion exchange is commonly used to chemically strengthen glasses. In one particular example, alkali cations within a source of such cations (e.g., a molten salt, or "ion exchange" bath) are exchanged for or replace smaller alkali cations within the glass to achieve a layer that is under a compressive stress (CS) near the surface of the glass. For example, potassium ions from the cation source are often exchanged with sodium ions within the glass. The compressive layer initially extends from the surface to a depth of layer (DOL) within the glass. Following treatment with the aqueous acid solution and formation of the silica-rich layer, the compressive layer extends from the depth of the silica-rich layer to the depth of layer within the glass.

In some embodiments, the compressive stress of the compressive layer has a maximum value of at least about 300 MPa and, in other embodiments, at least about 400 MPa. In certain embodiments, the maximum compressive stress is in a range from about 400 MPa to about 900 MPa. The depth of the compressive layer DOL, in some embodiments, is at least about 20 microns (μm) and, in other embodiments, is at least about 30 μm. In certain embodiments, the depth of layer is in a range from about 20 μm to about 100 μm.

The depth or thickness of the scratch-resistant silica-rich layer is typically less than the depth of the compressive layer of the strengthened glass article. In some embodiments, the thickness of the silica-rich layer is about 600 nm or less and, in some embodiments, less than about 100 nm. In other embodiments, the silica-rich layer has a thickness ranging from about 100 nm to about 600 nm.

A cross-sectional schematic view of a planar ion exchanged glass article having a scratch resistant silica-rich surface layer is shown in FIG. 1. Glass article 100 has a thickness t, first surface 110, and second surface 112. While the embodiment shown in FIG. 1 depicts glass article 100 as a flat planar sheet or plate, glass article 100 may have other configurations, such as three dimensional shapes or non-planar configurations. Porous silica-rich layers 130, 132 extend from surfaces 110, 112 to depths $d_3$, $d_4$ in glass article 100, and provide a scratch-resistant layer. Glass article 100 also has a first compressive layer 120 extending from depth $d_3$ of silica rich-layer 130 to a depth of layer $d_1$ into the bulk of the glass article 100. In the embodiment shown in FIG. 1, glass article 100 also has a second compressive layer 122 extending from depth $d_4$ of silica rich-layer 132 to a second depth of layer $d_2$. Glass article 100 also has a central region 130 that initially extends from $d_1$ to $d_2$. Central region 130 is under a tensile stress or central tension (CT), which balances or counteracts the compressive stresses of layers 120 and 122. The depth $d_1$, $d_2$ of first and second compressive layers 120, 122 protects the glass article 100 from the propagation of flaws introduced by sharp impact to first and second surfaces 110, 112 of glass article 100, while the compressive stress minimizes the likelihood of a flaw penetrating through the depth $d_1$, $d_2$ of first and second compressive layers 120, 122.

Although the surface layers 130, 132 of the acid treated glass is silica-rich and the ion exchanged compressive stress layers 120, 122 comprise additional alkali cations, the compositions of the bulk of the glass articles described herein remain essentially unchanged. The bulk or base glass, in some embodiments, is an alkali aluminosilicate glass. In other embodiments, the bulk or base glass article is an alkali aluminoborosilicate glass. In still other embodiments, the bulk or base glass article is a borosilicate glass that is substantially free of alkali metals and/or oxides thereof.

In some embodiments, the alkali aluminosilicate glass comprises at least about 4 mol % $P_2O_5$, wherein ($M_2O_3$ (mol %)/$R_xO$ (mol %))<1, where $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In certain embodiments, the glass comprises 0 mol % $B_2O_3$. In some embodiments, the glass is ion exchanged to a depth of layer of at least about 10 μm and comprises at least about 4 mol % $P_2O_5$, wherein 0.6<[$M_2O_3$ (mol %)/$R_xO$(mol %)]<1.4; or 1.3<[($P_2O_5+R_2O$)/$M_2O_3$]≤2.3; where $M_2O_3=Al_2O_3+B_2O_3$, $R_xO$ is the sum of monovalent and divalent cation oxides present in the alkali aluminosilicate glass, and $R_2O$ is the sum of monovalent cation (i.e., alkali) oxides present in the alkali aluminosilicate glass. The glass is described in U.S. patent application Ser. No. 13/678,013 by Timothy M. Gross, entitled "Ion Exchangeable Glass with High Crack Initiation Threshold," and U.S. patent application Ser. No. 13/677,805 by Timothy M. Gross, entitled "Ion Exchangeable Glass with High Crack Initiation Threshold," both filed Nov. 15, 2012, and claiming priority to U.S. Provisional Patent Application No. 61/560,434 filed Nov. 16, 2011. The contents of these applications are incorporated herein by reference in their entirety.

In other embodiments, the alkali aluminoborosilicate glass comprises: at least about 50 mol % $SiO_2$; at least about 10 mol % $R_2O$, wherein $R_2O$ comprises $Na_2O$; $Al_2O_3$; and $B_2O_3$, wherein $B_2O_3-(R_2O-Al_2O_3)\geq3$ mol %. In some embodiments, the glass comprises: at least about 50 mol % $SiO_2$; at least about 10 mol % $R_2O$, wherein $R_2O$ comprises $Na_2O$; $Al_2O_3$, wherein $Al_2O_3$ (mol %)<$R_2O$ (mol %); and from about 3 mol % to about 4.5 mol % $B_2O_3$, wherein $B_2O_3$ (mol %)−($R_2O$ (mol %)−$Al_2O_3$ (mol %))≥3 mol %. In certain embodiments, the glass comprises: at least about 50 mol % $SiO_2$; from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0 mol %≤MgO≤6 mol % and 0 mol %≤ZnO≤6 mol %; and, optionally, at least one of CaO, BaO, and SrO, wherein 0 mol %≤CaO+SrO+BaO≤2 mol %. When ion exchanged, the glass, in some embodiments, has a Vickers crack initiation threshold of at least about 10 kgf. Such glasses are described in U.S. patent application Ser. No. 14/197,658, filed May 28, 2013, by Matthew J. Dejneka et al., entitled "Zircon Compatible, Ion Exchangeable Glass with High Damage Resistance," which is a continuation of U.S. patent application Ser. No. 13/903,433, filed May 28, 2013, by Matthew J. Dejneka et al., entitled "Zircon Compatible, Ion Exchangeable Glass with High Damage Resistance," both claiming priority to Provisional Patent Application No. 61/653,489, filed May 31, 2012. The contents of these applications are incorporated herein by reference in their entirety.

In some embodiments, the alkali aluminoborosilicate glass comprises: at least about 50 mol % $SiO_2$; at least about 10 mol % $R_2O$, wherein $R_2O$ comprises $Na_2O$; $Al_2O_3$; wherein −0.5 mol %≤$Al_2O_3-R_2O$≤2 mol %; and $B_2O_3$, and wherein $B_2O_3-(R_2O$ (mol %)−$Al_2O_3$)≥4.5 mol %. In other embodiments, the glass has a zircon breakdown temperature that is equal to the temperature at which the glass has a viscosity of greater than about 40 kPoise and comprises: at least about 50 mol % $SiO_2$; at least about 10 mol % $R_2O$, wherein $R_2O$ comprises $Na_2O$; $Al_2O_3$; and $B_2O_3$, wherein $B_2O_3-(R_2O-Al_2O_3)\geq4.5$ mol %. In still other embodiments, the glass is ion exchanged, has a Vickers crack initiation threshold of at least about 30 kgf, and comprises: at least about 50 mol % $SiO_2$; at least about 10 mol % $R_2O$, wherein $R_2O$ comprises $Na_2O$; $Al_2O_3$, wherein −0.5 mol %≤$Al_2O_3-R_2O$≤2 mol %; and $B_2O_3$, wherein $B_2O_3-(R_2O-Al_2O_3)\geq4.5$ mol %. Such glasses are described in U.S. patent application Ser. No. 13/903,398, by Matthew J. Dejneka et al., entitled "Ion Exchangeable Glass with High Damage Resistance," filed May 28, 2013, claiming priority from U.S. Provisional Patent Application No. 61/653,485, filed May 31, 2012. The contents of these applications are incorporated by reference herein in their entirety.

In other embodiments the alkali aluminosilicate glass comprises: from about 70 mol % to about 80 mol % $SiO_2$; from about 6 mol % to about 12 mol % $Al_2O_3$; from about 0 mol % to about 15 mol % $B_2O_3$; from about 0 mol % to about 15 mol % $Li_2O$; from about 0 mol % to about 20 mol % $Na_2O$; from about 0 mol % to about 10 mol % $K_2O$; from about 0 mol % to about 8 mol % MgO; from about 0 mol % to about 10 mol % CaO; from about 0 mol % to about 5 mol % each of ZnO, $ZrO_2$, and $Fe_2O_3$; and from 0 mol % to about 1 mol % each of $SnO_2$ and $P_2O_5$. In some embodiments, $SiO_2+B_2O_3+Al_2O_3\geq86.5$ mol % and $R_2O-RO-Al_2O_3<5$ mol %; and, in other embodiments, $SiO_2+B_2O_3+Al_2O_3\geq86.5$ mol % and $R_2O-RO-Al_2O_3<5$ mol %. Such glasses are described in U.S. Provisional Patent Application No. 61/987,795, filed May 2, 2014, by Jeffrey Scott Cites et al., entitled "Strengthened Glass and Compositions Therefor," the contents of which are incorporated by reference herein in their entirety.

In some embodiments, the alkali aluminosilicate and alkali aluminoborosilicate glasses described hereinabove are substantially free of (i.e., contain 0 mol %) of at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and may have liquidus viscosities of at least 130 kilopoise.

In other embodiments, the glass is a borosilicate glass such as, for example, Corning Eagle XG® glass, manufactured by Corning Incorporated.

In another aspect, a method of increasing the scratch resistance of a chemically strengthened glass article is provided. A porous silica-rich layer is formed on the surface of the glass article. The silica-rich layer extends from the surface of the glass article to a depth of up to about 600 nm or less and, in some embodiments, less than about 400 nm. In other embodiments, the silica-rich layer has a thickness ranging from about 100 nm to about 600 nm. The glass article, in some embodiments, is treated with an aqueous solution comprising at least one mineral acid such as, but not limited to hydrochloric (HCl), nitric ($HNO_3$), sulfuric ($H_2SO_4$), combinations thereof, or the like. The aqueous acid solution, in some embodiments, has an acid concentration ranging from about 0.005 normal (N) to about 1.0 N. In one particular embodiment, the acid concentration of the solution is about 0.2 N. In some embodiments, the aqueous acid solution is substantially free of or does not contain hydrofluoric acid (HF). During this process, other elements present in the glass (e.g., alkalis, alkaline earths, aluminum, boron, phosphorus, etc.) are selectively leached out of the affected area, leaving behind the silica-rich layer, which is integral to the glass article. The porous silica-rich layer improves the scratch resistance, as characterized by the Knoop scratch threshold, of the glass surface. The at least one mineral acid is applied to the surface to be treated by those means known in the art, such as immersion, dipping, spraying, brushing, spinning, or the like. The aqueous solution comprising the at least one mineral acid is allowed to stay in contact with the surface for a time sufficient to form a silica-rich layer having a desired depth or thickness. The actual time required needed to achieve a desired depth or thickness of the layer depends on multiple factors, including concentration of the aqueous acid solution, temperature of the substrate and/or acid solution, glass composition, and the like.

The acid treatment of the chemically strengthened glass article with the aqueous acid solution takes place at a predetermined or selected temperature. In some embodiments, the glass article and/or the solution are heated at a temperature ranging from about 25° C. to about 95° C. In other embodiments, the glass article and/or the solution are heated at a temperature ranging from about 50° C. to about 95° C. The glass article, for example, may be at room temperature, while the aqueous acid solution is heated to the desired temperature. Alternatively, both the glass article and the aqueous solution may be preheated prior to treatment.

The method described herein results in up to a four-fold improvement in the scratch resistance of ion-exchangeable glasses. In some embodiments, the glasses treated in accordance with this method exhibit up to a four-fold improvement in scratch-resistance compared that strengthened samples of identical composition that are not treated ("non-treated"). In some embodiments, the acid treatment of the samples tested involves exposure of a glass plate to an aqueous solution of 0.02N $H_2SO_4$ or 1 molar (M) $HNO_3$ at 95° C. for 24 hours. During acid exposure, elements of the glass are selectively leached, leaving behind a silica-rich surface layer (e.g., 130, 132 in FIG. 1) having a composition that differs significantly from that of the bulk.

Scratch resistance of selected glasses was evaluated using a Knoop diamond indenter. The scratch threshold is determined by first identifying the load range for lateral crack onset. Once the load range is identified, a series of 5 mm long scratches under constant load are generated at a speed of 4 mm/s. Scratches are made under increasing load, with three or more scratches per load, in order to identify the Knoop scratch threshold. Lateral cracks are defined as sustained cracks that are greater than twice the width of the groove.

Figure 2:
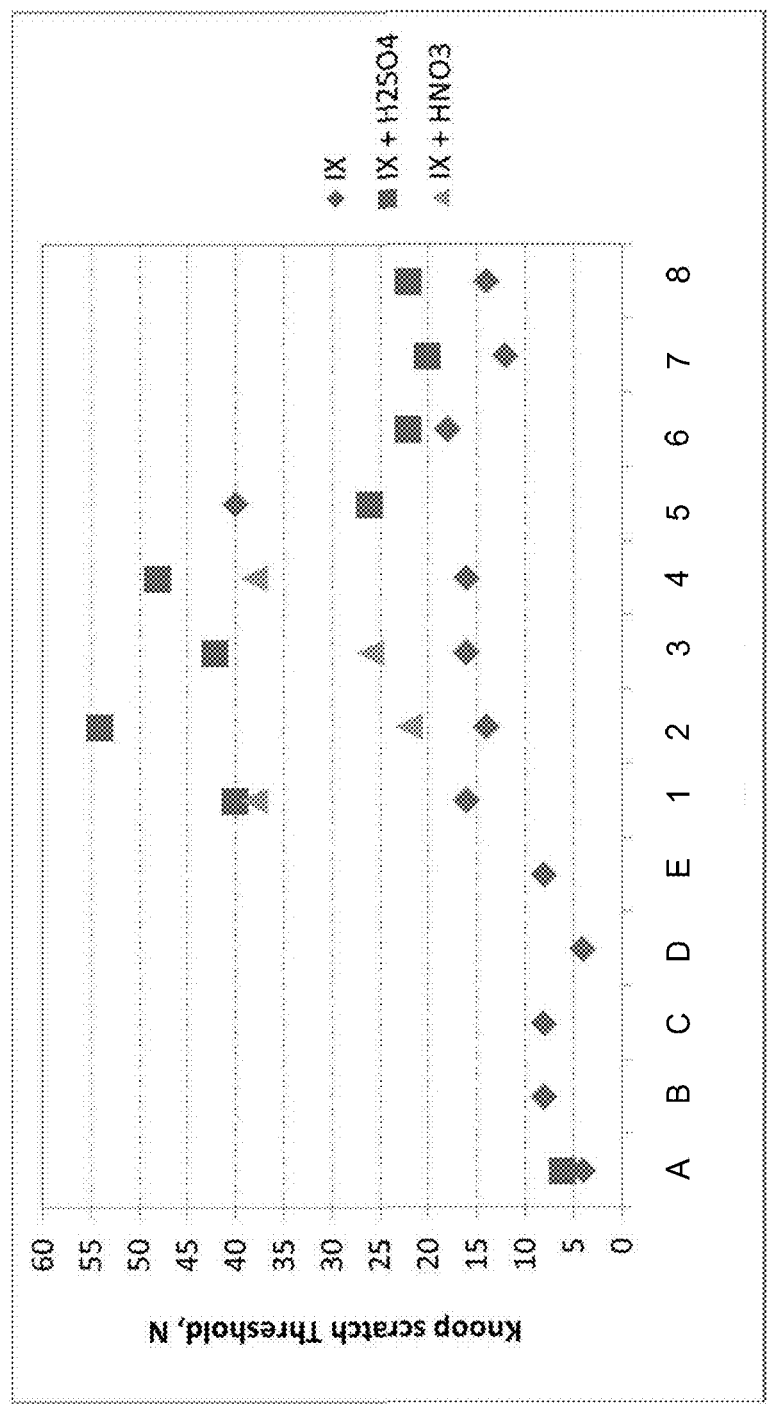
FIG. 2 is a plot of Knoop scratch thresholds measured of glasses that ion-exchanged and glasses that were ion exchanged and then acid treated.

Results of Knoop scratch threshold measurements for glass compositions tested after ion exchange (IX), and after ion exchange followed by the acid treatment described herein are plotted in FIG. 2 and listed in Table 1. In FIG. 2 and Table 1, examples A-E are different compositions of Corning Gorilla® Glass, manufactured by Corning Incorporated. In FIG. 2, Knoop scratch thresholds of several non-treated ion-exchanged glasses are compared to those of ion-exchanged glasses that were subsequently acid treated. All samples listed in Tables 1 and 2 were ion exchanged in molten $KNO_3$ salt baths. Ion exchange bath temperatures were in a range from about 390° C. to about 480° C. and ion exchange times ranged from two to eight hours. Acid treatments were performed on post-ion exchange glasses using 0.02 N $H_2SO_4$ or 1 molar (M) $HNO_3$ at 95° C. for 24 hours. Compared to the ion exchanged Corning Gorilla® Glasses, the data plotted in FIG. 2 show that the acid treatment described herein yields up to a four-fold increase in Knoop scratch threshold of several ion-exchanged glasses. Higher observed Knoop scratch thresholds may indicate that acid treated glass surfaces are less vulnerable to damage caused by sand and objects that are harder than the glass surface, which in turn relates to less visible damage and higher preserved strength.

TABLE 1

Compositions glasses and Knoop scratch threshold (KST) data obtained for ion exchanged glasses with and without subsequent acid treatment acid.

| Mol % | A | B | C | D | E | F |
|---|---|---|---|---|---|---|
| $SiO_2$ | 69.2 | 64.4 | 64.7 | 68.8 | 67.4 | |
| $Al_2O_3$ | 8.5 | 13.9 | 13.9 | 10.6 | 12.7 | |
| $B_2O_3$ | 0.0 | 7.2 | 5.1 | 0.0 | 3.7 | |
| $Li_2O$ | 0.0 | 0.0 | 0.0 | 0.0 | 0.0 | |
| $Na_2O$ | 13.9 | 14.0 | 13.8 | 14.9 | 13.7 | |
| $K_2O$ | 1.2 | 0.5 | 0.0 | 0.0 | 0.0 | |
| MgO | 6.5 | 0.0 | 2.4 | 5.4 | 2.4 | |
| ZnO | 0.0 | 0.0 | 0.0 | 0.0 | 0.0 | |
| CaO | 0.5 | 0.1 | 0.1 | 0.0 | 0.0 | |
| $P_2O_5$ | 0.0 | 0.0 | 0.0 | 0.0 | 0.0 | |
| $SnO_2$ | 0.2 | 0.1 | 0.1 | 0.2 | 0.1 | |
| Knoop Scratch Threshold (N) | | | | | | |
| ion-exchanged glass | 4-6N | 8-10N | 8-12N | 4-5N | 8-12N | 10-12N |
| IX + 0.02N $H_2SO_4$ @95 C. 24 h | 6-8N | | | | 18-20N | 20-22N |
| IX + 1M $HNO_3$ @95 C. 24 h | | | | | 18-20N | |

TABLE 2

Compositions glasses and Knoop scratch threshold (KST) data obtained for ion exchanged glasses with and without subsequent acid treatment acid.

| Mol % | 1 | 2 | 3 | 4 | 5 | 6 | 7 | 8 |
|---|---|---|---|---|---|---|---|---|
| $SiO_2$ | 70.1 | 70.1 | 70.1 | 70.1 | 73.0 | 72.0 | 70.0 | 70.5 |
| $Al_2O_3$ | 10.0 | 10.0 | 10.0 | 10.0 | 9.2 | 9.3 | 10.0 | 10.3 |
| $B_2O_3$ | 6.3 | 4.3 | 6.3 | 8.4 | 7.1 | 7.4 | 7.9 | 8.0 |
| $Li_2O$ | 0.0 | 0.0 | 0.0 | 0.0 | 0.5 | 0.5 | 0.5 | 0.5 |
| $Na_2O$ | 11.2 | 11.2 | 9.2 | 9.2 | 9.7 | 10.3 | 11.1 | 10.2 |
| $K_2O$ | 0.2 | 0.2 | 2.2 | 2.2 | 0.5 | 0.5 | 0.5 | 0.5 |
| MgO | 0.0 | 0.0 | 0.0 | 0.0 | 0.0 | 0.0 | 0.0 | 0.0 |
| ZnO | 0.0 | 0.0 | 0.0 | 0.0 | 0.0 | 0.0 | 0.0 | 0.0 |
| CaO | 0.0 | 0.0 | 0.0 | 0.0 | 0.0 | 0.0 | 0.0 | 0.0 |
| $P_2O_5$ | 2.0 | 4.0 | 2.0 | 0.0 | 0.0 | 0.0 | 0.0 | 0.0 |
| $SnO_2$ | 0.1 | 0.1 | 0.1 | 0.1 | 0.1 | 0.1 | 0.1 | 0.1 |
| Knoop Scratch Threshold (N) | | | | | | | | |
| ion-exchanged glass | 16-18N | 14-16N | 16-18N | 16-18N | >40N | 18-20N | 12-14N | 14-16N |
| IX + 0.02N $H_2SO_4$ @95 C. 24 h | 40-44N | 54-56N | 42-44N | 48-50N | 26-28N | 22-24N | 20-22N | 22-24N |
| IX + 1M $HNO_3$ @95 C. 24 h | 38-40N | 22-24N | 26-28N | 38-40N | | | | |

Figure 3:
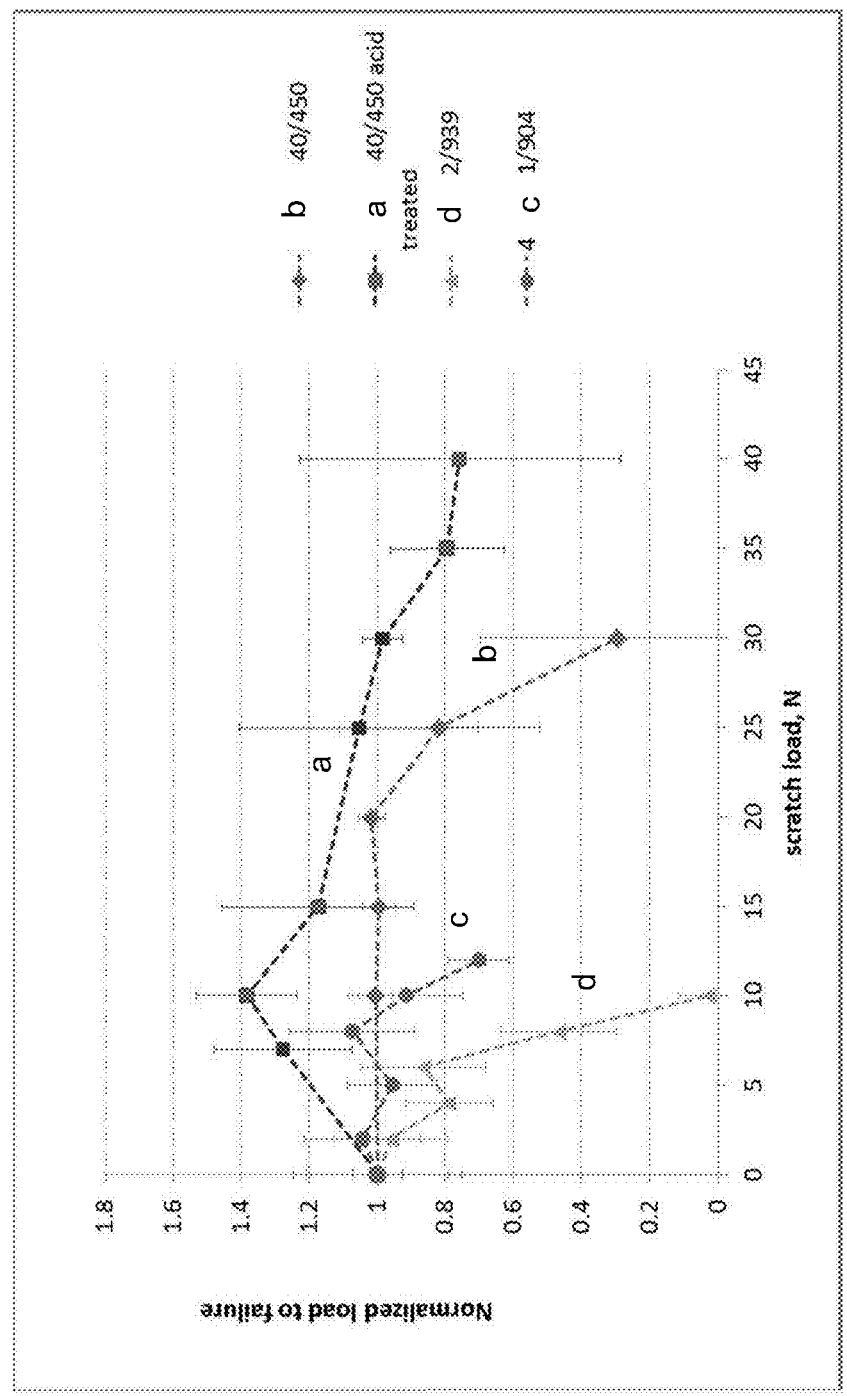
FIG. 3 is a plot of normalized load-to-failure of glass samples that were scratched at different loads.

FIG. 3 is a plot of normalized load to failure for glass samples scratched at different loads. The data show retained strength post-scratch application for ion-exchanged glasses having the composition of example 4 in Table 2 that were acid treated according to the methods described herein (a in FIG. 3) and non-treated ion exchanged samples (b in FIG. 3). Data for similarly treated and ion exchanged glass samples in FIG. 3. Sample d in FIG. 3 is Corning Gorilla® Glass example D (Table 1) and sample c in FIG. 3 is Corning Gorilla® Glass example C (Table 1). The acid treatment of sample a in FIG. 3 consisted of exposing the glass to 0.02 N $H_2SO_4$ for 24 hours at 95° C. The acid treatments described herein allow glass strength to be maintained at scratch loads as high as 40 Newtons (N), as compared to about 25N for the non-acid treated glasses.

Figures 4A, 4B:
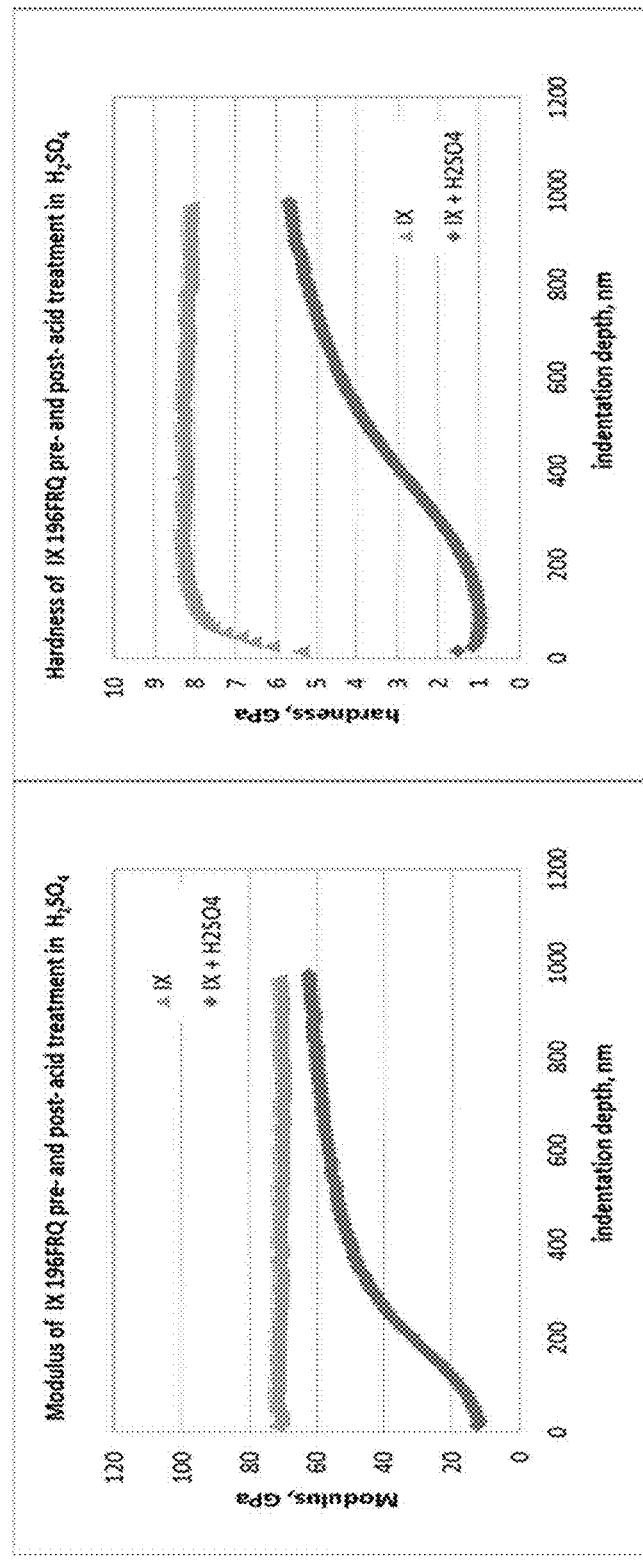
FIG. 4A is a plot of modulus measurements of ion-exchanged glass before and after acid treatment in $H_2SO_4$.
FIG. 4B is a plot of hardness measurements of ion-exchanged glass before and after acid treatment in $H_2SO_4$.
Figure 5:
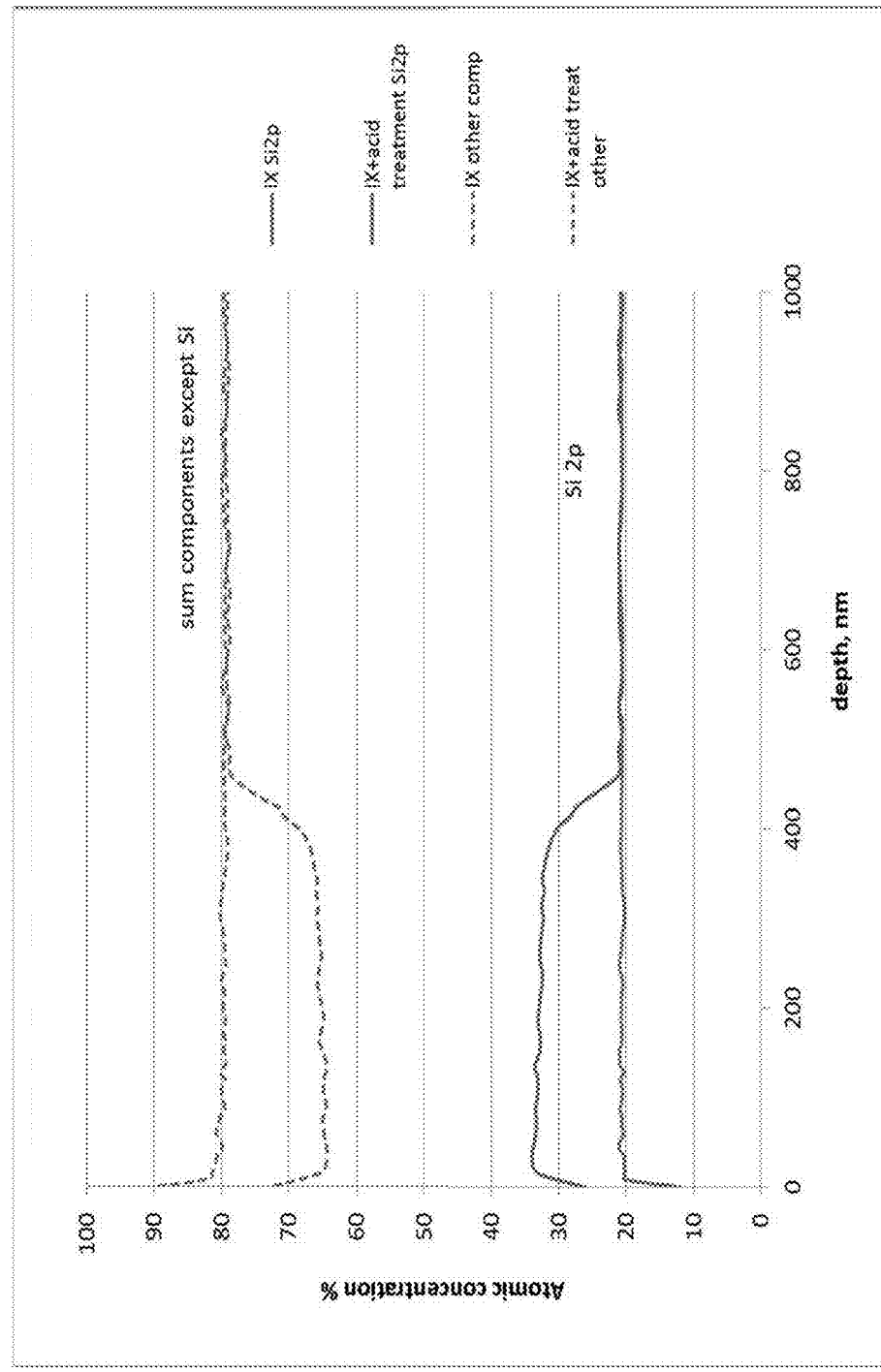
FIG. 5 is a plot of results x-ray photoelectron spectroscopy (XPS) analysis of the surface of ion exchanged glass and glass that was ion exchanged and then acid treated in 0.02N $H_2SO_4$ at 95° C. for 24 hours.

Increased hardness is typically regarded as the solution for improving scratch resistance of glass surfaces. Hardness usually scales linearly with elastic modulus. FIGS. 4A and 4B are plots of modulus and hardness, respectively, measured via nano-indentation of the glass surface for the glass of example D in Table 1 with and without acid treatment. The acid treated glass exhibits a decrease in modulus of 70.5 GPa to 12.2 GPa and a decrease in hardness from about 8.3 GPa to about 1 GPa. This low modulus "soft" surface results in a Knoop Scratch Threshold ranging from about 48N to about 50N, which is about three times that of the non-acid treated glass. Analytical results of the untreated and acid treated surfaces of the ion exchanged glass of example 4 (Table 2) by x-ray photoelectron spectroscopy (XPS) are shown in FIG. 5. Some of the ion exchanged samples were acid treated in 0.02 N $H_2SO_4$ at 95° C. for 24 hours. Compared to the non-acid treated glass, the acid treated samples each have a silica-rich surface layer that is depleted of all other glass components and having a thickness ranging from about 400 nm to about 500 nm. The acid-treated glass has a silica-rich surface layer that transitions smoothly into the bulk glass composition. This layer provides a compliant layer that dissipates the energy imposed by the scratch, and thus protects the glass from forming and propagating strength limiting flaws.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the scope of the present disclosure or appended claims.

The invention claimed is:

1. A method of improving the scratch resistance of a glass, the method comprising:
   a. treating a surface of the glass with an acid at a predetermined temperature for a predetermined time;
   b. removing non-silica components from the surface; and
   c. forming a porous silica-rich layer on the surface of the glass, wherein the silica-rich layer extends from the surface to a depth of greater than or equal to 100 nm to less than or equal to 600 nm into the glass.

2. The method of claim 1, further comprising ion exchanging the glass prior to treating the surface with an acid.

3. The method of claim 2, wherein the glass article has a compressive layer extending from the depth of the silica-rich layer to a depth of layer of greater than or equal to 20 μm, and wherein the compressive layer has a maximum compressive stress of greater than or equal to 300 MPa.

4. The method of claim 2, wherein the glass article has a Knoop scratch initiation threshold of greater than or equal to 12 N.

5. The method of claim 2, wherein the glass article has a Knoop scratch initiation threshold of greater than or equal to 16 N.

6. The method of claim 2, wherein the glass article has a Knoop scratch initiation threshold of greater than or equal to 20 N to less than or equal to 60 N.

7. The method of claim 1, wherein the glass article has a Vickers crack initiation threshold of greater than or equal to 5 kgf.

8. The method of claim 1, wherein the glass article comprises an alkali aluminosilicate glass.

9. The method of claim 8, wherein the glass article comprises an alkali aluminoborosilicate glass.

10. The method of claim 1, wherein the glass comprises a borosilicate glass.

11. The method of claim 1, wherein forming the porous silica-rich layer comprises treating the surface with at least one mineral acid other than hydrofluoric acid.

12. The method of claim 11, wherein the at least one mineral acid comprises at least one of HCl, $HNO_3$, and $H_2SO_4$.

13. The method of claim 11, wherein the at least one mineral acid is present in a concentration of greater than or equal to 0.02 N.

14. The method of claim 13, wherein the at least one mineral acid is present in a concentration in a range from 0.02N up to 60 N.

15. The method of claim 1, wherein the predetermined temperature is in a range from 25° C. up to 95° C.

16. The method of claim 1, wherein the predetermined time is in a range from 1 hour up to 24 hours.

* * * * *

UNITED STATES PATENT AND TRADEMARK OFFICE
CERTIFICATE OF CORRECTION

PATENT NO. : 11,034,611 B2
APPLICATION NO. : 15/585817
DATED : June 15, 2021
INVENTOR(S) : Sinue Gomez et al.

It is certified that error appears in the above-identified patent and that said Letters Patent is hereby corrected as shown below:

On the Title Page

On page 2, in Column 2, item [56], Line 10, delete "(2000)" and insert -- (2009) --, therefor.

On page 2, in Column 2, item [56], Line 11, delete ""Microstruture" and insert -- "Microstructure --, therefor.

On page 3, in Column 1, item [56], Line 4, delete "growth" and insert -- crack growth --, therefor.

On page 3, in Column 1, item [56], Line 9, delete "separation" and insert -- phase separation --, therefor.

On page 3, in Column 1, item [56], Line 12, delete "limel" and insert -- lime --, therefor.

On page 3, in Column 1, item [56], Line 24, delete "1103-1108." and insert -- 1103-1106. --, therefor.

On page 3, in Column 2, item [56], Line 3, delete "Cermic" and insert -- Ceramic --, therefor.

On page 3, in Column 2, item [56], Line 6, delete "grasses" and insert -- glasses --, therefor.

On page 3, in Column 2, item [56], Line 7, delete "Theiss," and insert -- Thesis, --, therefor.

In the Specification

In Column 1, Lines 4-8, delete "This application claims the benefit of priority under 35 U.S.C. .sctn. 119 of U.S. Provisional Application Ser. No. 62/000,717, filed on May 20, 2014, the content of which is relied upon and incorporated herein by reference in its entirety." and insert
-- CROSS-REFERENCE TO RELATED APPLICATIONS
This is a divisional application of U.S. Patent Application No. 14/714,819, filed on May 18, 2015, the content of which is relied upon and incorporated herein by reference in its entirety, and the benefit of Signed and Sealed this
Thirty-first Day of May, 2022

Katherine Kelly Vidal
*Director of the United States Patent and Trademark Office* priority under 35 U.S.C. § 120 is here by claimed, which claims the benefit of priority under 35 U.S.C. § 119 of U.S. Provisional Application Serial No. 62/000,717, filed on May 20, 2014, the contents of which are relied upon and incorporated herein by reference in their entirety. --, therefor.

In the Claims

In Column 11, Line 14, Claim 14, delete "0.02N" and insert -- 0.02 N --, therefor.